(12) United States Patent
Xavier

(10) Patent No.: US 6,234,110 B1
(45) Date of Patent: May 22, 2001

(54) DEVICE FOR AND METHOD OF CLEANING AND/OR DISINFECTING A TEAT OF AN ANIMAL

(75) Inventor: Richard Xavier, Wigne sur Morder (FR)

(73) Assignee: Maasland N.V. a Dutch limited liability company, Maasland (NL)

( * ) Notice: Subject to any disclaimer, the term of this patent is extended or adjusted under 35 U.S.C. 154(b) by 0 days.

(21) Appl. No.: 09/272,566

(22) Filed: Mar. 19, 1999

(30) Foreign Application Priority Data

Mar. 23, 1998 (NL) .................................................. 1008673

(51) Int. Cl.⁷ ....................................................... A01J 7/00
(52) U.S. Cl. ..................................... 119/14.47; 119/14.18
(58) Field of Search ...................................... 119/670, 665, 119/666, 14.18, 14.47, 14.48, 14.49, 14.5, 14.51, 14.52, 14.53

(56) References Cited

U.S. PATENT DOCUMENTS

| | | | |
|---|---|---|---|
| 3,648,696 | * | 3/1972 | Keith ..................................... 604/310 |
| 3,713,423 | * | 1/1973 | Sparr, Sr. .............................. 119/670 |
| 4,034,714 | * | 7/1977 | Umbaugh et al. ................. 119/14.18 |
| 4,305,346 | * | 12/1981 | Sparr, Sr. .............................. 119/670 |
| 4,903,639 | * | 2/1990 | Kessel .................................. 119/670 |
| 4,924,809 | * | 5/1990 | Verbrugge .......................... 119/14.02 |
| 5,101,770 | * | 4/1992 | Stevenson ............................... 119/670 |
| 5,390,627 | * | 2/1995 | Van Den Berg et al. .......... 119/14.08 |
| 5,673,650 | * | 10/1997 | Mottram et al. ...................... 119/651 |
| 5,934,220 | * | 8/1999 | Hall et al. .......................... 119/14.08 |

FOREIGN PATENT DOCUMENTS

| | | | |
|---|---|---|---|
| 207572 A1 | * | 1/1987 | (EP) . |
| 277396 A1 | * | 8/1988 | (EP) . |
| 332235 A2 | * | 9/1989 | (EP) . |
| 349019 A2 | * | 1/1990 | (EP) . |
| 801893 A2 | * | 10/1997 | (EP) . |
| 89/00378 | * | 1/1989 | (WO) . |

* cited by examiner

Primary Examiner—Thomas Price
(74) Attorney, Agent, or Firm—Penrose Lucas Albright

(57) ABSTRACT

The invention relates to a device for cleaning and/or disinfecting a teat of an animal immediately prior to or subsequent to the milking operation. The device comprises a teat receiving cup having a plurality of spray nozzles disposed on its upper side which are connected to receive cleansing fluid or disinfectant or both under pressure and capacity control to spray the animal's teats. The spray nozzles and supply lines thereto are affixed to the teat receiving cup so that the nozzles are pointed obliquely upwardly towards the center line of the teat receiving cup. The supply lines, including a distribution member for dividing fluid being conducted to the spray nozzles, is connected to the teat receiving cup by means of an elastic stocking or a shrink stocking.

16 Claims, 1 Drawing Sheet

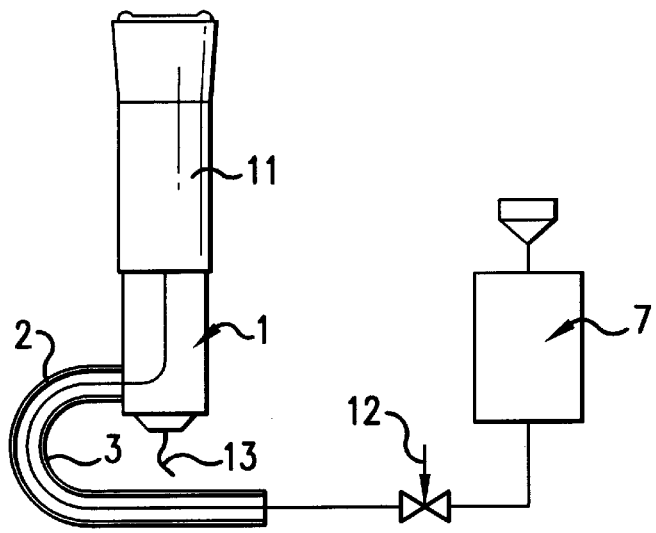
FIG.1
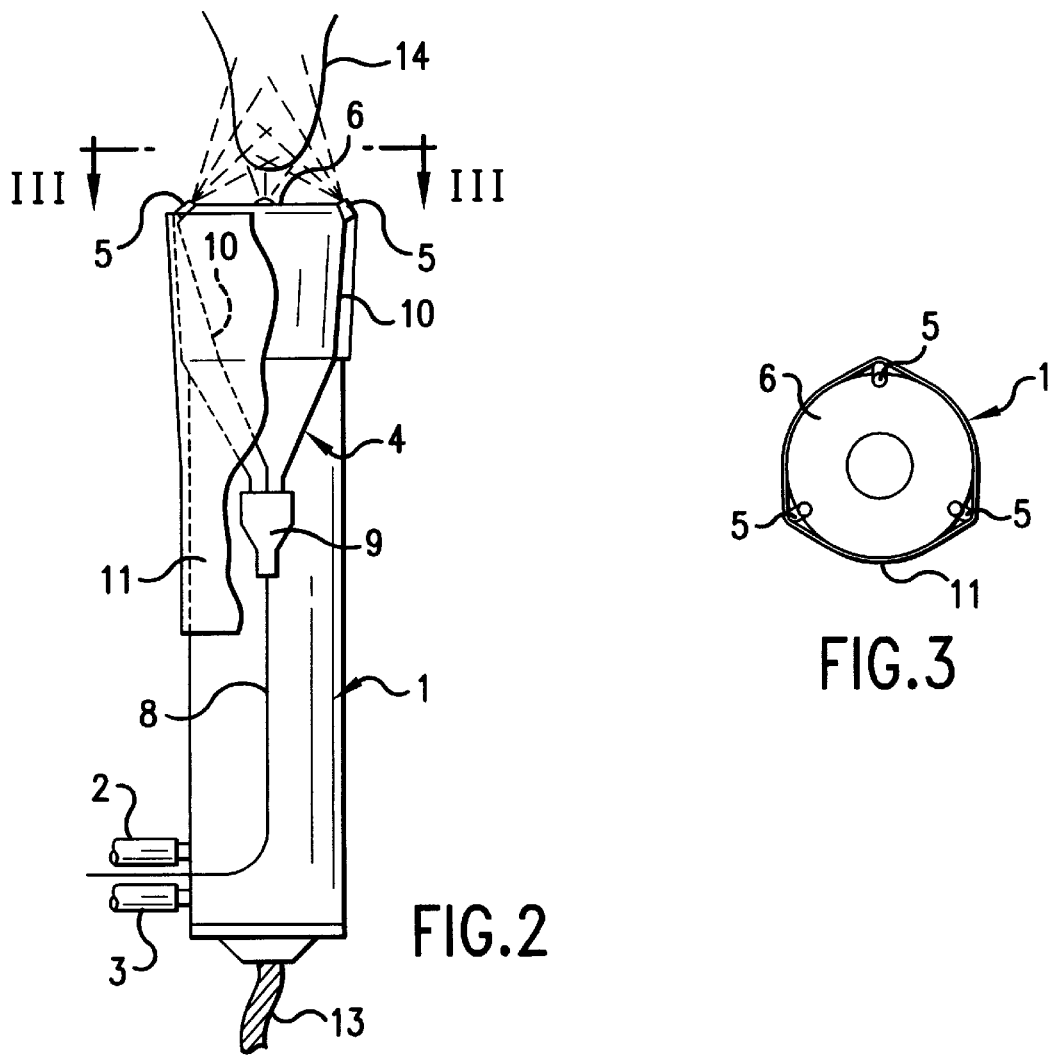
FIG.2
FIG.3

DEVICE FOR AND METHOD OF CLEANING AND/OR DISINFECTING A TEAT OF AN ANIMAL

FIELD OF THE INVENTION

The invention relates to a device for cleaning or disinfecting (or both) a teat of an animal, said device being provided in combination with a teat cup or a cleaning member for cleaning the teat of an animal to be milked.

SUMMARY OF THE INVENTION

The invention aims at improving such a device. In accordance with the invention, this is achieved in that the cleaning and disinfecting device is fitted to the teat cup or the cleaning member. A cleaning member that is disposed in the teat cup and by means of which the teat is cleaned in the teat cup is excluded in this situation. In a preferred embodiment of the invention, the cleaning and disinfecting device is arranged near the upper side of the teat cup. According to a further inventive feature, the cleaning and disinfecting device comprises one or more spraying elements. According to again another inventive feature, the spraying elements are disposed near the upper edge of the teat cup. According to a further inventive feature, the spraying elements are arranged around the upper edge of the teat cup.

In order to prevent cleaning and disinfecting fluids from being received in the teat cup, according to again another inventive feature, the spraying elements are arranged or designed in such a manner that during operation they spray the cleaning and disinfecting fluids obliquely upwardly from around the opening of the teat cup in the direction of its center line.

According to an inventive feature, the cleaning and disinfecting device is fitted to the outer casing of the teat cup. According to a further inventive feature, this can be provided in a simple manner in that the cleaning and disinfecting device is attached to the teat cup by means of an elastic stocking or shrink stocking.

In accordance with another aspect of the invention, the cleaning and disinfecting device comprises a supply line for supplying the cleaning and disinfecting fluid, as well as a distribution element connected thereto, with the aid of which distribution element the supply line is divided into further supply lines that lead to the spraying elements.

According to again another inventive feature, the device is provided with a milking robot by means of which the cleaning and disinfecting device can be moved towards the teats or be connected to the teats of an animal to be milked.

According to again another aspect of the invention, the device is provided with a withdrawal member for disconnecting the teat cup from a teat. In a preferred embodiment, the milking robot comprises the withdrawal member. According to again another inventive feature, the cleaning and disinfecting device comprises adjusting means with the aid of which the pressure applied or the period of time or both during which the fluid is sprayed against the teat can be controlled or adjusted or both.

The invention further relates to a method of cleaning and disinfecting a teat, in which method, during disconnection or just after disconnecting the teat cup from the teat, cleaning or disinfecting fluid or both are sprayed against a teat by means of a cleaning and disinfecting device.

The invention also relates to a method of cleaning a teat, in which method, prior to milking the animal and connecting the teat cup to a teat of the animal, the teat is cleaned by means of a cleaning device fitted to the teat cup.

BRIEF DESCRIPTION OF THE DRAWINGS

The invention will now further be explained with reference to the accompanying drawings in which:

FIG. 1 is a side elevational view of a teat cup provided with a cleaning and disinfecting device in accordance with the invention;

FIG. 2 is a side elevational view of the teat cleaning and disinfecting device in accordance with the invention which illustrates its operation; and FIG. 3 is a plan view of a teat cup as viewed in the direction of arrows III—III in FIG. 2.

DETAILED DESCRIPTION OF THE PREFERRED EMBODIMENTS

FIG. 1 is a side elevational view of a device for cleaning and disinfecting a teat, which device is provided with a teat cup 1 having a milk line 2 and a pulsation line 3. As shown in FIG. 2, teat cup 1 is provided with a cleaning and disinfecting device 4 which comprises three spraying elements 5 (See also FIG. 3). Spraying elements 5 are disposed near an upper edge 6 of teat cup 1. In this situation spraying elements 5 are arranged, or in another embodiment designed, so as to spray the cleaning and disinfecting fluids during operation obliquely upwards relative to the opening of teat cup 1 in the direction of its center line. The cleaning fluid or disinfecting fluid or a combined form thereof is stored under pressure in a pressure vessel 7. To the pressure vessel 7 there is connected a supply line 8 in which a distribution element 9 is included, which distribution element 9 divides the supply line 8 into three further supply lines 10 each of which comprises at its end a spraying element 5. The distribution element 9 and further supply lines 10 are fixed relative to the teat cup 1 by means of an elastic stocking or a shrink stocking 11 which is disposed around the outer casing of teat cup 1.

The cleaning and disinfecting device 4 is further provided with computer-controlled adjusting means 12 by which the spray pressure or the period of time during which the fluid is sprayed against a teat, or both, can be controlled or adjusted or both.

Arranged near the lower side of teat cup 1 is a flexible withdrawal element 13 which is connected to a withdrawal member by means of which the teat cup 1 can be withdrawn to a robot arm of a milking robot.

The above-described device operates as follows:

Before teat cup 1 is connected automatically to a teat 14 of an animal to be milked, teat cup 1 is positioned under teat 14. Thereupon the computer-controlled adjusting means 12 are activated automatically, after which cleaning fluid is sprayed against teat 14. After teat 14 has been cleaned, teat cup 1 is connected automatically to teat 14 of the animal to be milked, whereupon milking is started. After the udder quarter of which teat 14 constitutes part has been milked out, teat cup 1 is drawn automatically towards the robot arm by means of a withdrawal member and withdrawal element 13. Together with disconnecting teat cup 1 from teat 14, disinfecting device 4 is automatically activated with the aid of the computer-controlled adjusting means 12, in such a manner that, during disconnecting teat cup 1 from teat 14, disinfecting fluid is sprayed against the teat 14 by means of spraying elements 5.

In the above-described embodiment only one pressure vessel 7 is shown, so that the choice is limited to either cleaning or disinfecting teat 14; however, it will be obvious that, if both cleaning and disinfecting or any other treatments are desired, it is possible to connect a plurality of pressure vessels 7 for different fluids to supply line 8 to provide a selection between different treatments.

Although I have disclosed the preferred embodiments of my invention, it is to be understood that it is capable of other adaptations and modifications within the scope of the following claims:

Having disclosed my invention, what I claim as new and to be secured by Letters Patent of the United States of America is:

1. A device for cleaning and disinfecting a teat of an animal, said device comprising a teat cup, fluid spray means for spraying a fluid which is selected from a group consisting of a cleanser or a disinfectant or a combination thereof, said fluid spray means being fitted to the top periphery of the teat cup, said fluid spray means being disposed to spray said fluid on said teat when said teat is disposed completely outside of and above said top periphery of said teat cup.

2. A device in accordance with claim 1, wherein said fluid spray means comprises spraying elements is which spray obliquely upwardly in the direction of the center line of said teat cup.

3. A device in accordance with claim 1, wherein said fluid spray means comprises at least three spraying elements.

4. A device in accordance with claim 3, wherein said spraying elements are disposed proximate the upper edge of said teat cup.

5. A device in accordance with claim 4, wherein said spraying elements are disposed around said upper edge.

6. A device in accordance with claim 5, wherein said spraying elements are arranged to spray fluid obliquely upwardly relative to an opening for receiving the animal's teat in said teat cup in the direction of the center line of said teat cup which extends through said opening.

7. A device in accordance with claim 1, wherein said teat cup comprises an outer casing and said spray means is mounted on said outer casing.

8. A device in accordance with claim 1, wherein said spray means is connected to said teat cup by means of an elastic stocking.

9. A device in accordance with claim 1, wherein said spray means is connected to said teat cup by means of a shrink stocking.

10. A device in accordance with claim 3, comprising a supply line and a distribution element whereby fluid being supplied to said spraying elements is divided into at least three parts by said distribution element and from there conveyed to said spraying elements through individual conduits leading from said distribution element to said spraying elements.

11. A device in accordance with claim 1, which comprises a milking robot for moving said teat cup relative to said teat.

12. A device in accordance with claim 1, comprising withdrawal means for disconnecting said teat cup from said teat.

13. A device in accordance with claim 12, wherein said withdrawal means comprises a part of a milking robot.

14. A device in accordance with claim 1, comprising pressure and capacity adjusting means that controls the fluid pressure and rate of fluid which is received by said spray means and sprayed therefrom against said teat.

15. A method of cleaning or disinfecting the teat of an animal during a milking process which comprises connecting a teat cup to said teat wherein said teat cup has fluid spray means affixed thereto, and placing said teat cup so it is outside of and centered completely below said teat, spraying said teat while centered completely above said teat cup with a fluid selected from a group consisting of a cleansing fluid or a disinfectant or a combination thereof whereby the surface of said teat is completely cleansed or disinfected selectively immediately either before or after said animal is milked or both before and after said animal is milked.

16. A method of cleaning a teat prior to milking an animal and connecting a teat cup to a teat of the animal, moving said teat cup so that it is centered completely below said teat with a fluid spray means connected thereto and spraying said teat while it is centered completely above said teat cup with a cleansing fluid from said fluid spray means whereby the surface of said teat is completely cleaned by said cleansing fluid.

\* \* \* \* \*